… BEST AVAILABLE COPY

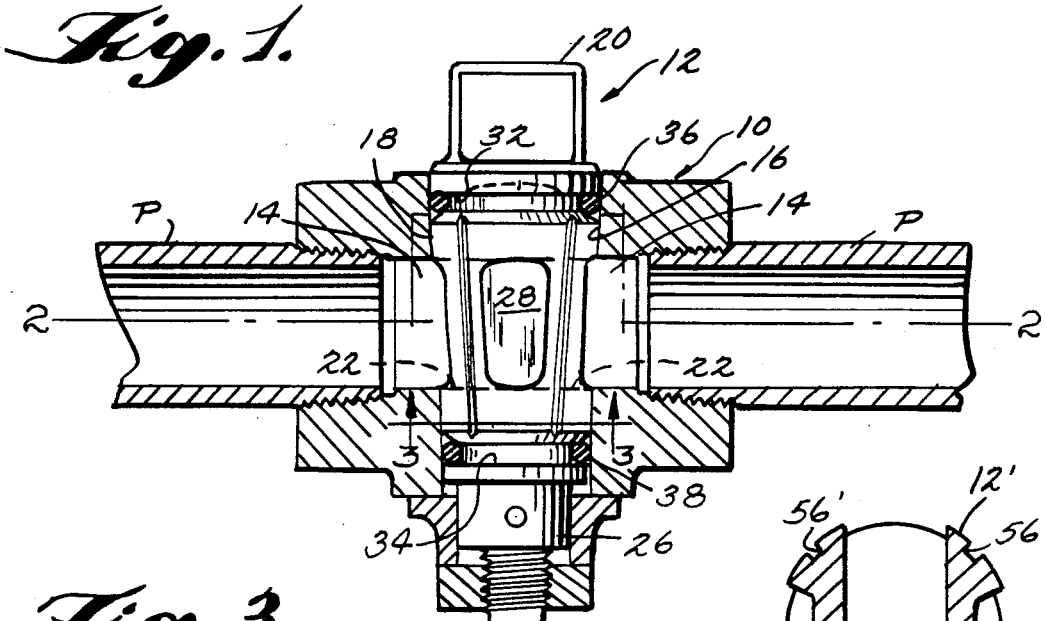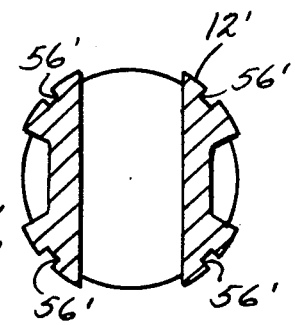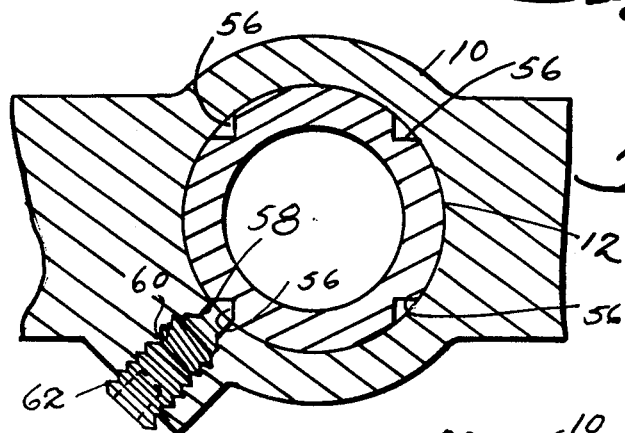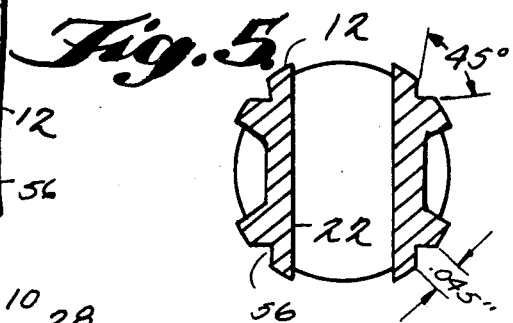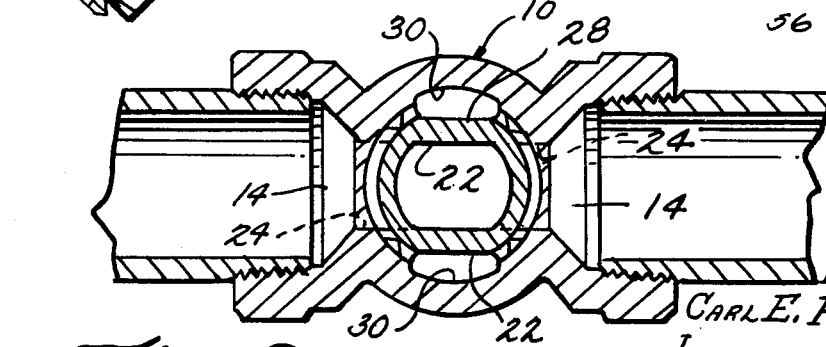

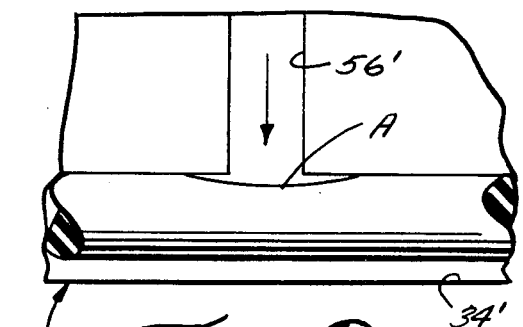
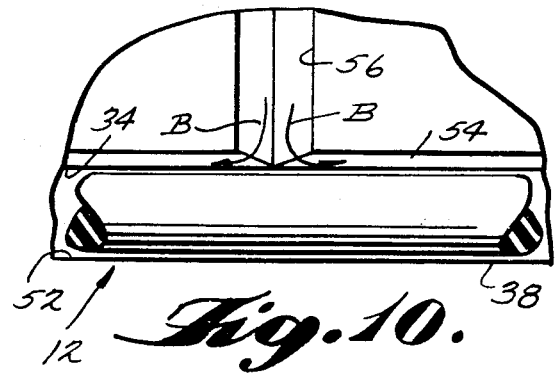
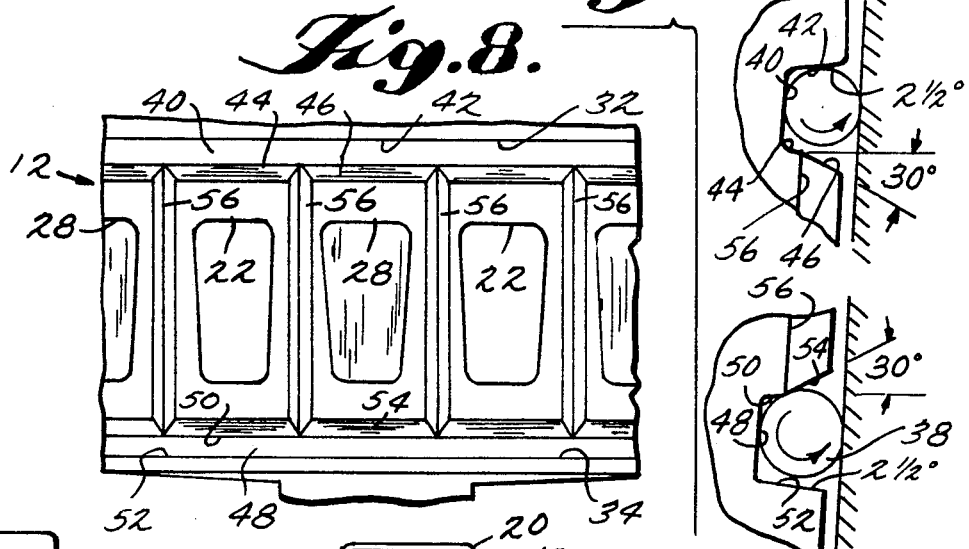
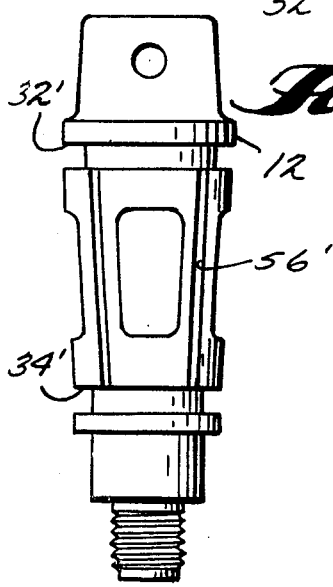
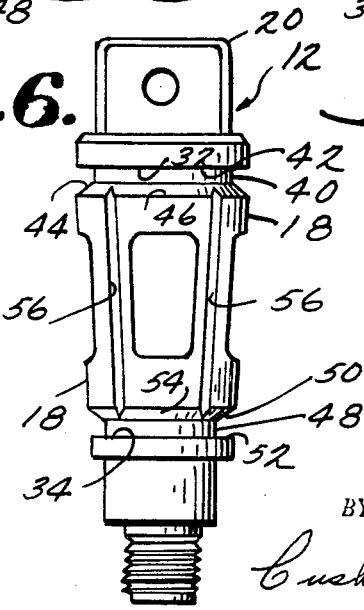

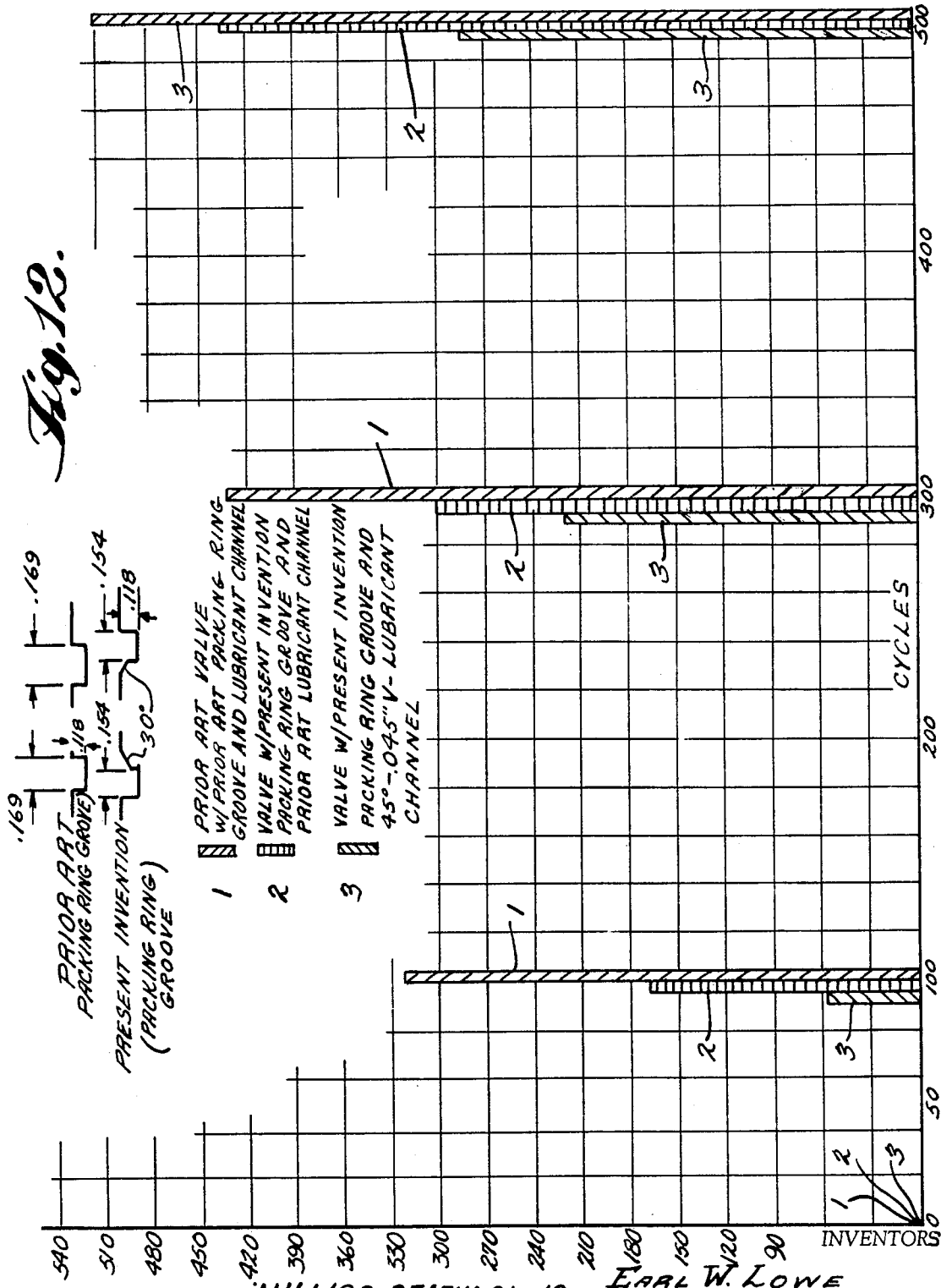

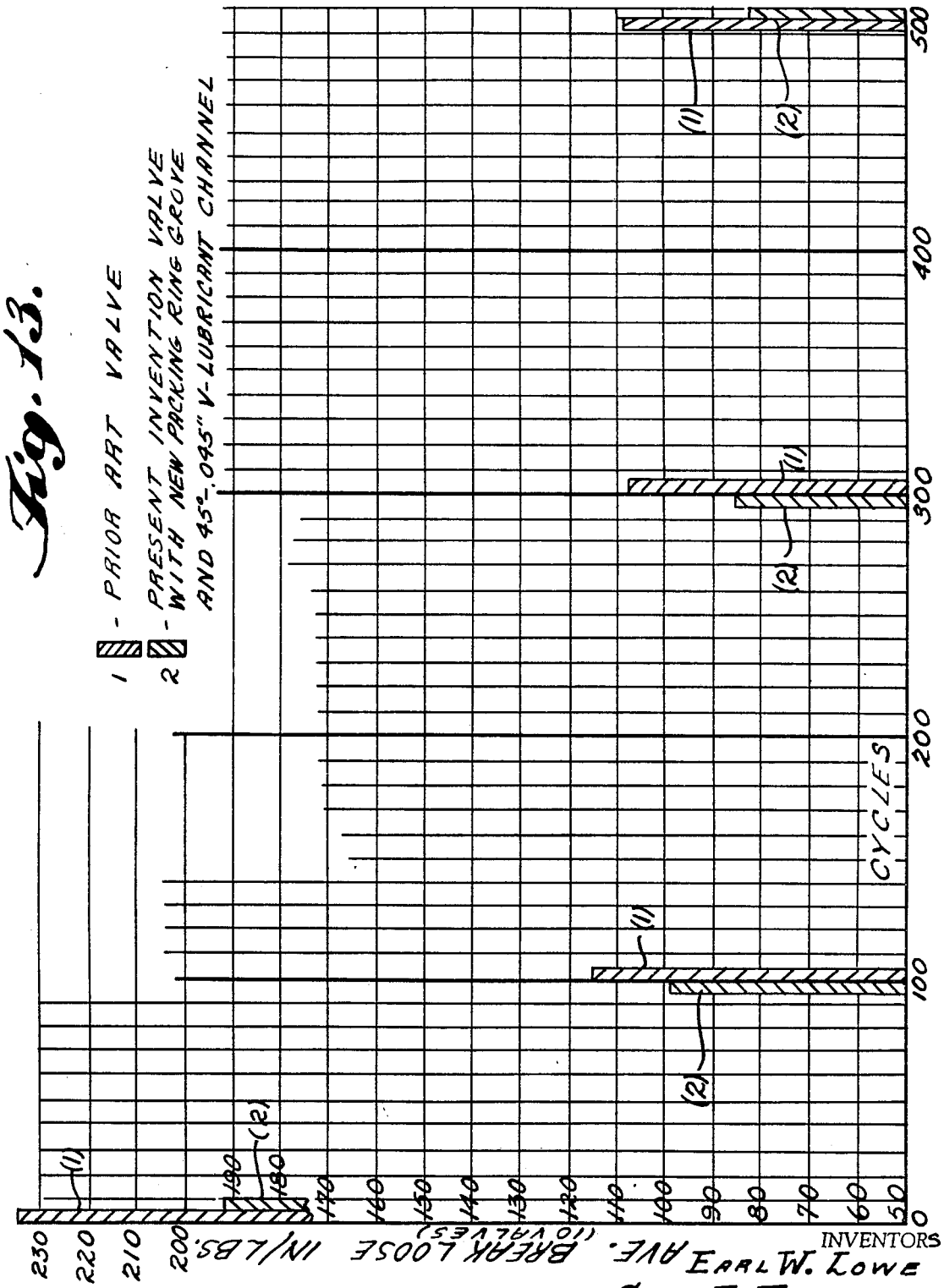

United States Patent Office 3,509,903
Patented May 5, 1970

3,509,903
LUBRICATED ROTARY PLUG VALVE
Earl W. Lowe, Carl E. Floren, and Lawrence F. Luckenbill, Decatur, Ill., assignor to Mueller Co., Decatur, Ill., a corporation of Illinois
Filed July 17, 1968, Ser. No. 745,495
Int. Cl. F16k 5/22
U.S. Cl. 137—246.15      15 Claims

ABSTRACT OF THE DISCLOSURE

A rotary plug valve having a valve body member provided with a ported plug seat and a ported valve plug member rotatable in said seat for opening and closing the valve. The valve is provided with a closed lubricant system defined by at least one lubricant channel in one of the opposed surfaces of the seat and the plug member, the lubricant channel interrupting at least one packing groove provided on one of the opposed surfaces, the packing groove having a particular configuration which enables the closed lubricant system to be charged with a lubricant and the packing ring in the groove being uniformly deformed against the wall of the groove so as to reduce localized lubricant pressure loss and increase the effective capacity of the lubricant reservoir of the system.

---

The present invention relates to improvements in rotary plug valves having a closed lubricant system, and more particularly, to improvements in lubricated rotary plug valves of the types shown in United States Pat. No. 2,653,791 to Frank H. Mueller and issued Sept. 29, 1953, and United States Pat. No. 2,829,667 to Frank H. Mueller issued Apr. 8, 1958.

In the plug valve shown in the aforementioned Mueller Pat. 2,653,791, a circumferential groove is provided in one of the opposed surfaces of the plug and the valve seat adjacent both ends of the latter. Positioned in these grooves are O-rings, which provide end seals between the seat and plug at both ends of the seat. One or more longitudinal lubricant channels in one of the opposed surfaces of the plug and seat extend between and connect the inner sides of the O-ring grooves. Thus, there is formed a closed lubricant system which includes the longitudinal lubricant channel or channels and the lubricant reservoir space in the O-ring grooves in the inner side of the rings therein.

In the aforementioned United States Pat. 2,829,667 there is a similar closed lubricant system disclosed but in this patent means are provided for interrupting communication between the longitudinal lubricant channel and the O-ring grooves whenever the lubricant channel is exposed to a port or a false port. This arrangement prevents the loss of lubricant by extrusion from the channel into the port or false port due to the pressure on the lubricant and hence from the lubricant reservoir in the O-ring grooves. While the rotary plug valves of both of the aforementioned patents have been very successful, for their intended purposes, nevertheless, their operation over an extended period of time required periodic replacement of lubricant as the localized loss of lubricant pressure from the stored energy capacity of the O-rings dissipated from continued use. This resulted because the O-ring grooves were substantially rectangular in cross-section and thus did not provide for a sufficient lubricant reservoir under pressure or for efficient and uniform filling of the closed lubricant system.

Therefore, it is an object of the present invention to provide a lubricant plug valve of the types shown in the aforementioned patents with an improved closed lubricant system having means to insure a uniform loading of lubricant about the packing rings so that there is less loss of localized pressure, the closed lubricant system further providing a greater supply of lubricant so that the efficiency and life of the plug valve is increased.

Ancillary to the immediately preciding object it is a further object of the present invention to provide an improved lubricant channel communicating with the improved design of packing grooves, the lubricant channel providing a better wiping action of lubricant so as to further increase the overall efficiency of the system.

Still another object of the present invention is to provide an improved rotary plug valve with a closed lubricant system in which the packing ring grooves and the longitudinal lubricant channels may be easily machined into the valve members, the grooves and channels being so designed to eliminate chips from machining being retained in the lubricant channel. Additionally, the lubricant channel and packing ring groove design is such that if there is chip break out at the juncture of the grooves and channel, such break out is in a non-critical portion of the packing ring groove where it will not engage and harm the packing rings.

These and other objects and advantages of the present invention will be more apparent from the following specification, claims and drawings in which:

FIG. 1 is a vertical, longitudinal sectional view through the valve assembly, the ported valve plug member being shown in elevation;

FIG. 2 is a horizontal sectional view taken on the line 2—2 of FIG. 1;

FIG. 3 is a fragmentary sectional view taken on the line 3—3 of FIG. 1, the view being enlarged to illustrate the means for charging the closed lubricant system;

FIG. 4 is a horizontal sectional view through a valve plug member made according to the prior art as shown in the aforementioned patents;

FIG. 5 is a horizontal sectional view of a valve plug member made according to the present invention and illustrating the improved lubricant channels;

FIG. 6 is a side elevational view of the plug member of FIG. 4 made according to the prior art;

FIG. 7 is a side elevational view of the plug member made according to the present invention;

FIG. 8 is a diagrammatic layout of the plug member of FIG. 7 and illustrating the packing ring grooves and lubricant channels of the same;

FIG. 9 is a diagrammatic view representing the loading of lubricant in the lubricant channel and to the packing ring groove of a plug valve of the prior art;

FIG. 10 is a view similar to FIG. 9 but illustrating the loading of the closed lubricant system of the present invention;

FIG. 11 is a diagrammatic view illustrating the insertion of the valve plug member into the valve seat, the view showing the rolling of the packing rings;

FIG. 12 is a bar graph comparing the port leakage in cubic centimeters per minute for cycles of operation of the prior art rotary plug valves with respect to the rotary plug valves of the present invention, and FIG. 13 is a bar graph comparing average break loose pressure in inch-pounds for cycles of operation of the prior art rotary plug valves with respect to rotary plug valves of the present invention.

Referring now to the drawings wherein like character or reference numerals represent like or similar parts, the rotary plug valve of the present invention comprises a valve body member or casing generally designated at 10, and a valve plug member or key generally designated at 12. The body member 10 has a flow passage extending therethrough constituted by the openings 14, the outer ends of which are threaded, as is usual for connections with other parts of the system being controlled, such as the ends P of sections of a pipeline. Of course, other means of connection may be employed, such as flange connections.

Extending laterally through the body member 10 is a valve plug seat 16 which is tapered at least in a major or principal portion. The valve plug member 12 comprises a major or principal portion, which is exteriorly tapered as at 18, to be received in the tapered portion of the plug seat 16 of the body member 10, and a reduced operating extension 20, as is usual in valve structures of this general type. The lateral opening through the body member 10, which forms the plug seat 16 extends entirely through the body member and across the flow passage therethrough thus the plug seat constitutes a ported plug seat. The tapered major portion of the plug member 12 has a port 22 (FIG. 2) extending therethrough, this port having straight sidewalls which align with the straight sidewall surfaces 24 of the passage in the body member 10 when the valve plug member 12 is turned to its open position.

At the lower end of the valve plug member 12, beyond the tapered major or principal portion thereof, there is provided a lower reduced valve stem 26 providing means for securing the valve plug member or key in the body member 10, for example, as described in Pat. 2,653,791.

The port 22 is of a height substantially equal to that of the inner ends of the flow passage opening or ports 14, and the tapered exterior surface of the valve plug member 12 and the tapered interior surfaces of the ported plug seat 16 above and below and on each side of the port 22 and the passage openings 10 are ground to one another, each plug member to its particular body member, so that there is a central seating zone of opposed tapered surfaces surrounding the ports of the plug seat 16 and the port 22 of the plug member 12 where the respective surfaces are in intimate contact with one another when the valve plug member is adjusted and fixed in its proper seating position in its seat. The opposed engaging surfaces of the valve plug member 12 and the plug seat 16 of the body member 10 are relieved at opposite ends of the valve assembly, whereby said surfaces have end zones where they are slightly spaced from and out of contact with one another. These relieved areas, which are at opposite axial ends of the central seating zone, may or may not be tapered depending upon the design of the particular valve, as sealing means are provided at each axial end of the central seating zone as will be described later in the specification.

The valve plug member 12 in its tapered or conical seating surface 18 may be provided intermediate of its ports 22 with false or blind ports 28, which are generally of the same configuration as the ports 22 in cross-section. The blind ports 28 are adapted to be aligned with similarly shaped recesses 30 in the plug seat 16 of the body member 10, at opposite sides thereof as shown in FIG. 2. The purpose of the blind ports 22, and the recesses, is to reduce the total area of metal-to-metal contact between the valve plug member 12 and the plug seat 16 in the body member 10 and, thus, reduce the resistance to turning of the plug member 12. The recesses 30 in the valve body member 10 are so arranged that they are presented to the ports 22 of the plug member 12 when the valve is closed so that there is no corrosion of any ground surface due to gas trapped in the blind ports of the valve plug member.

At opposite ends of the opposed seating surfaces 16 and 18 (the central zone), circumferential grooves 32 and 34 are provided in one of the surfaces, the grooves being shown in the drawings formed in the exterior surface of the valve plug member or key 12, it being understood that these grooves could be formed in the plug seat 16 of the body member 10 if so desired. In grooves 32 and 34 respectively, there are provided endless packing rings 36 and 38 made of a resilient deformable flexible material, the rings being generally circular in cross-section. As an example, the rings 36 and 38 may be made of elastomeric material such as rubber, synthetic rubber, or the like, which is very dense and yet possesses great liveliness and elasticity. Each of the rings 36 and 38 has a greater cross-sectional diameter than the depth of its respective circumferential grooves 32 and 34 so that when the valve plug member 12 is inserted into the body member 10 the rings will contact the bottom walls of the grooves and the opposed seating surfaces thereby providing end seals at each end of the central seating zone.

Referring now to FIGS. 1, 7, 8 and 11, it will be noted that the upper circumferential groove 32 of the valve plug member 12 is provided with a bottom wall 40, an upper or outer sidewall 42, and a lower or inner sidewall 44 which is adjacent the upper end of the conical or tapered seating surface 18 of the plug. The lower or inner wall 44 is provided with a chamfered or bevelled surface 46 which extends outwardly at an angle in the order of 30° to a radius of the plug member 12. The upper or outer wall 42 of the groove 40 extends at an angle in the order of 2½° to a radius of the valve plug member 12, the purpose of this angle being to make it easier to machine the groove and, therefore, for all practical purposes this wall functions the same as if it were lying in a radial plane of the valve plug member 12. The lower circumferential groove 34 is similarly designed in that it is provided with a bottom wall 48, an upper or inner sidewall 50, and a bottom or outer sidewall 52. The upper sidewall 50, which is adjacent the lower end of the seating surface 18, is provided with a chamfered or bevelled surface 54 also extending outwardly to the seating surface 18 at an angle in the order of 30° to a radius of the valve plug member 12. The purpose and function of the design of the grooves 32 and 34, as just described, will appear more fully in the specification when describing the closed lubricant system of the plug valve of the present invention.

As shown in FIGS. 1, 7 and 8, the inner sidewalls 44 and 50 of the grooves 32 and 34 are connected by four equally spaced longitudinally extending lubricant grooves or channels 56, the channels interrupting the seating surface 18 of the plug valve member 12 in the central seating zone of the valve structure. While the longitudinal channels 56 are shown on the valve plug member 12, it will be appreciated that these channels could be provided on the valve plug seat 16 of the valve body member 10 as could the grooves 32 and 34 or there could be a combination of positioning of the same where the grooves 32 and 34 are on a seating surface of one of the body plug members with the channels 56 being on the opposed surface of the other of the body or plug members. The channels 56 preferably are V-shaped in cross-section and have an included angle between their sidewalls in the order of 45°. Additionally, it will be noted that the depth of the channels 56 is less than the depth of the circumferential grooves 32 and 34 and, consequently, the chamfered or bevelled surfaces 46 and 54 of the respective circumferential grooves begins at a point where the bottom of the channels 56 intersects the grooves.

The longitudinal lubricant channels 56, together with the circumferential grooves 32 and 34 in the space therein not occupied by the packing rings 36 and 38 form a closed lubricant system which completely surrounds the opposite ends of the port 22 in the plug member 12 and the passage openings 14 in the plug seat 16 of the valve body member 10. In order to charge the closed lubricant system with a lubricant, a charging port 58 (FIG. 3) is provided through the wall of the valve body member 10 and arranged to communicate at its inner end with one of the longitudinal lubricant channels 56 when the valve is in either an open or closed position. The port 58 has its outer end enlarged as indicated at 60, the same being provided with interior threads for receiving a similarly threaded charging plug 62. With the plug 62 removed, a lubricant which is relatively thick and viscous is flowed through the port 58 into an aligned lubricant channel 56, the lubricant flowing upwardly and downwardly of the channel to the respective circumferential grooves 32 and 34. Since the grooves 32 and 34 are each provided with the bevelled of chamfered surface 46 and 54 respectively, there will be a space completely around the plug member 12 between the same and the packing rings 36 and 38 and the chamfered surfaces 46 and 54 respectively. Consequently, the lubricant under pressure can flow completely around this space and when this space is filled, the lubricant can then flow into the other longitudinal channels 56 not aligned with the port 58. When the system has been completely filled, the plug 62 is then inserted into the threaded portion 60 of the port 58, the plug acting as a piston applying a pressure to the lubricant within the closed system, forcing the packing rings 36 and 38 outwardly against the respective outer walls 42 and 52 of the grooves 32 and 34. The packing rings 36 and 38 are deformed by such action and because of the pressure exerted upon them, they are distorted from their natural relaxed condition resulting in a storing of energy on the lubricant within the closed system thereby maintaining the same under a constant pressure so that the lubricant can be discharged from the lubricant channels 56 against the opposed seating surfaces in the central zone by a wiping action of the same when the valve structure is operated.

Referring now to FIGS. 4, 6, and 9, there is disclosed a valve plug member 12' having a closed lubricant system of the type described in the aforementioned U.S. Pat. 2,653,791. It will be noted that the lubricant channels 56' were substantially rectangular in cross-section whereas the circumferential packing grooves 32' and 34' were also substantially rectangular in cross-section. The packing rings used with such a prior art plug had a cross-sectional diameter which had to be substantially less than the width of the packing ring groove although slightly greater than the depth of the groove in order to provide a seal and yet still provide somewhat of a reservoir for the lubricant. Consequently, when such a plug member 12' was inserted into the seat in a valve body, the O-ring packings rolled in a direction against the sidewall of the respective circumferential groove farthest away from the point of entry. Consequently, the lower O-ring packings in the lower circumferential groove 34' would roll upwardly against the wall closest to the central zone whereas the O-ring in the upper circumferential groove 32' would roll away from the wall adjacent the central zone. When lubricant was applied to such a system, it could properly flow about the plug in the upper groove thus deforming the O-ring packing but, as shown in FIG. 9, the O-ring packing in the lower circumferential groove would be blocking the end of the longitudinal lubricant channel 56' so that there was deformation of the O-ring packing only in a localized zone at A. This effectively reduced the capacity of the lubricant as well as reduced the amount of stored energy in the O-rings for supplying lubricant to the longitudinal lubricant channels during operation of the valve. Additionally, by having the longitudinal lubricant channels substantially rectangular in cross-section, there was not an efficient wiping of lubricant onto the opposed seating surfaces of the central zone and too much unusable lubricant was left remaining in the channels once the stored energy of the O-ring packings had been dissipated. The machining of the circumferential grooves and the longitudinal lubricant channels, when of a rectangular cross-section, required expensive inspection procedures as the grooves in the channels had to be thoroughly cleansed to eliminate any chips which might remain. In this respect, the machining of the longitudinal lubricant channels often resulted, at the point where they communicated with the circumferential grooves, in a chip breakout into the packing groove and any chips inadvertently left in this area were critical as there was the possibility of such chips, if not removed, damaging the packing ring due to the close tolerances of the ring in the circumferential groove.

Referring now to FIGS. 10 and 11, it will be noted that even though the lower O-ring or packing ring 38 of the valve structure of the present invention tends to roll away from the outer sidewall 52 of the circumferential groove 34 and toward the inner sidewall 50, it still does not block the entry of the channel 56 with the groove and because the sidewall 50 is provided with the bevelled or chamfered surface 54 leaving a space between the O-ring and the same completely around the plug member 12. Lubricant can flow, as shown by the arrows B in FIG. 10, completely around the plug so that when final pressure is applied to the lubricant it will uniformly deform the lower O-ring or packing ring 38 as well as the upper O-ring 36, thus, realizing full potential of the stored energy from the same as well as realizing a maximum reservoir space between the O-rings and their grooves.

In comparing the performance of plug valves made according to the prior art as exemplified by Pat. 2,653,791 and the present invention, reference is now made to FIGS. 12 and 13 wherein port leakage for cycles of operation and break loose pressure for cycles of operation respectively are compared for the prior art valve and the valve made according to the present invention. For the purpose of the tests resulting in each bar of the graphs of FIGS. 12 and 13, ten prior art valves were tested and ten valves made according to the present invention were tested, the differences in the valves being primarily the differences in the two closed lubricating systems. Each valve tested, i.e., the prior art valve and the valve of the present invention, was what is known in the art as a three-quarter inch plug valve. Referring first to the prior art valve, the plug of the same had circumferential packing ring grooves, which were approximately .169 inch wide by .118 inch deep, which resulted in a cross-sectional area of .020 square inch. The cross-sectional area of the circumferential packing ring grooves of the prior art valve minus the area for the O-ring itself, with the O-ring being one-eighth of an inch in cross-sectional diameter, was .008 square inch. The lubricating channels for the prior art valve tested were ⅗₄ of an inch wide and ¹⁄₁₆ of an inch deep and thus their cross-sectional area equalled about .0028 square inch. From the above dimensions, it will be apparent that the cross-sectional area of lubricant channels as compared to the cross-sectional area of the seating ring grooves is about one-third. The sum total of the volume for lubricant in the seating ring grooves is .06288 cubic inch whereas the volume for the lubricant in lubricant channels is .01639 cubic inch.

In the plug valve of the present invention the packing ring grooves were .154 inch wide by .118 inch deep but they were provided with the chamfered surface extending in the order of 30° and, consequently, the total of volume of the groove, allowing for the ⅛ inch cross-sectional diameter O-ring, was .05411 cubic inch. The lubricant channel for the plug valve of the present invention was V-shaped in cross-section and had a width of .045 inch at its widest point and a depth in the order of .054 inch as well as an included angle between its walls of 45°. The volume for the lubricant channels of the plug valve of the present invention was .01639 cubic inch.

The recovery capacity of the closed lubricant system of both the prior art plug valve and the plug valve of the present invention may be defined as the ratio of the total volume of the packing groove volume allowing for the volume of the packing ring over the total volume of the lubricant channel. While the closed lubricant system of the present invention had a somewhat smaller volume for both the lubricant channels and the packing grooves, the resulting ratio for reservoir recovery capacity was about double. In other words, the ratio for the prior art valve was $$\frac{.06288}{.01639} = 3.84$$

whereas the ratio for the present design was $$\frac{.05411}{.00718} = 7.55$$

Referring to FIG. 12 it will be noted that there are three bars at each of the cycle tests run, each bar representing the test results of ten valves of a particular type tested. In all of the tests conducted on the valves, none of the valves were relubricated, i.e., the reservoir for lubricant was not refilled. Total port leakage for ten valves having closed lubricating systems made according to the prior art was 320 cubic centimeters per minute after 100 cycles of operation. At 300 cycles of operation, the same ten valves showed a leakage of approximately 430 cubic centimeters per minute whereas after 500 cycles of operation, the total port leakage was approximately 520 cubic centimeters per minute.

Ten hybrid valves utilizing the packing ring grooves of the present invention with the chamfered surface and the prior art lubricant channels, that is, the channels which are generally rectangular in cross-section, were similarly tested at 100, 300 and 500 cycles of operation. It will be noted that there is considerable improvement in performance of total port leakage of these hybrid valves as the total port leakage was 165, 300, and 435 cubic centimeters per minute for tests conducted at 100, 300 and 500 cycles respectively.

A third set of ten valves was tested, these valves each having packing ring grooves made according to the present invention with the chamfered surface and lubricant grooves which were V-shaped in cross-section having a width of .045 inch and an included angle of 45°. It will be quite apparent from the bar graph of FIG. 12 that this latter-mentioned group of valves showed marked improvement over both of the aforementioned groups of valves. In more detail, tests were again run at 100, 300 and 500 cycles of operation and the total port leakage was 55, 220, and 280 cubic centimeters per minute.

The bar graph of FIG. 13 represents a cycle test between the prior art valve and the valve of the present invention and shows the lubricant reservoir of each by relating the break loose torque in inch-pounds to the cycles of operation. Again ten valves made according to the prior art construction were tested at 100, 300 and 500 cycles and it will be noted that the average break loose torque was 115, 108 and 108 inch-pounds respectively. The ten valves made according to the present invention and utilizing the improved packing ring grooves as well as the .045 V-lubricant channel were similarly tested at 100, 300 and 500 cycles with the results being 98, 85 and 82 inch-pounds respectively for the break loose torque. This marked improvement in performance of the valves made according to the present invention is interpreted as the increased performance in the recovery capacity of the reservoir for the lubricant. As hereinbefore mentioned, it must be emphasized that the valves tested were not lubricated during the tests and, consequently, these tests were indicative of the recovery capacity of the reservoir to reduce break loose torque.

The plug valve of the present invention heretofore described and illustrated in the drawings fully and effectively accomplishes the objects and advantages of the present invention. It will be realized, however, that the foregoing specific embodiments have been shown and described for the purposes of illustrating the principles of the invention and are subject to some changes and modifications without departing from such principles or from the spirit of the invention.

Therefore, the terminology used throughout the specification is for the purpose of description and not limitation, the spirit and scope of the invention being defined in the claims.

What is claimed is:

1. A rotary plug valve comprising: a valve body member provided with a ported plug seat; a period valve plug member rotatable in said seat, the opposed surfaces of said seat and said plug member having sealing engagement in at least a central zone that surrounds the seat and plug member ports; one of said opposing surfaces of said seat and said plug member adjacent one end of said central zone having a circumferential packing groove therein extending around said plug member, said groove having a bottom wall and sidewalls, the sidewall adjacent said central zone having a chamfered surface; a pressure-deformable resilient packing ring in said groove contacting the bottom of said groove and the other of said surfaces to provide a seal therebetween; lubricant channel means interrupting said opposed surfaces and extending from said groove the length of said central zone; means for supplying lubricant under pressure to said lubricant channel means and said groove whereby lubricant fills said channel means and deforms said packing ring uniformly against the sidewall of said groove away from said central zone; and means adjacent the other end of said central zone for sealing the seat and plug member.

2. A rotary plug valve as claimed in claim 1 in which said lubricant channel means includes at least one lubricant channel extending longitudinally of said central zone on the one of said opposed surfaces.

3. A rotary plug valve as claimed in claim 2 in which said longitudinally extending lubricant channel is V-shaped in cross-section.

4. A rotary plug valve as claimed in claim 1 in which the opposed surfaces of said seat and said plug member at least in the central zone are tapered axially, and in which said circumferential packing groove is positioned about the one end of said central zone which is smaller.

5. A rotary plug valve as claimed in claim 4 in which said chamfered surface of said groove extends at an angle in the order of 30° to a radius of the groove.

6. A rotary plug valve as claimed in claim 1 in which said lubricant channel means includes at least one lubricant channel extending longitudinally of said central zone on the one of said opposed surfaces, said lubricant channel opening to said groove and having a depth less than the depth of said groove, said chamfered surface of said groove commencing at a point where the bottom of said channel intersects said groove and extending at an angle in the order of 30° to a radius of the groove.

7. A rotary plug valve as claimed in claim 6 in which said lubricant channel is V-shaped in cross-section and has an included angle in the order of 45°.

8. A rotary plug valve as claimed in claim 7 in which the opposed surfaces of said seat and said plug member at least in the central zone are tapered axially and in which said circumferential packing groove is positioned about the one end of said central zone which is smaller.

9. A rotary plug valve as claimed in claim 1 in which said sealing means at the other end of said central zone includes a circumferential packing groove in the one of said surfaces of said seat and said plug member, said last-mentioned circumferential packing groove having a bottom wall and sidewalls, the one of said sidewalls adjacent said central zone having a chamfered surface; and a pressure-deformable resilient packing ring in said last-mentioned groove contacting the bottom thereof and the other of said surfaces, said lubricant channel means also extending from said last-mentioned groove.

10. A rotary plug valve as claimed in claim 9 in which said circumferential grooves and said lubricant sealing means are on said plug member.

11. A rotary plug valve comprising: a valve body member provided with a ported plug seat; a ported valve plug member insertable into said seat in one direction only with the opposed surfaces of said seat and said plug member when said plug member is inserted therein having sealing engagement in at least a central zone that surrounds the seat and plug member ports; one of said opposing surfaces of said seat and said plug member adjacent each end of said central zone having circumferential packing grooves extending around said valve member, each of said grooves having a bottom wall and sidewalls with the one of said grooves positioned farthest from the entry of the plug member into said seat member having one of its sidewalls closest to said central zone provided with a chamfered surface; a pressure-deformable resilient packing ring in each of said grooves contacting the bottom thereof with the other of said surfaces to provide seals at each end of said central zone; at least one longitudinal lubricant channel in the one of said surfaces terminating at its ends in the respective grooves; and means for supplying lubricant under pressure to said longitudinal lubricant channel and to said grooves whereby lubricant under pressure deforms said packing rings uniformly against the respective sidewalls of said grooves away from said central zone.

12. A rotary plug valve as claimed in claim 11 in which the other of said grooves has one of its sidewalls closest to said central zone provided with a chamfered surface, the chamfered surface of each of said grooves extending at an angle in the order of 30° to a radius of the groove.

13. A rotary plug valve as claimed in claim 12 in which said lubricant channel has depth less than the depth of said grooves and said chamfered surface of each of said grooves commences at a point where the bottom of said channel intersects said groove.

14. A rotary plug valve as claimed in claim 13 in which said lubricant channel is V-shaped in cross-section and has an included angle in the order of 45°.

15. A rotary plug valve comprising: a valve body member provided with a ported plug seat; a ported valve plug member rotatable in said seat, the opposed surfaces of said seat and said plug member being tapered in and having sealing engagement in at least a central zone that surrounds the seat and plug member ports; said plug member having circumferential packing grooves extending around the same at the ends of said central zone, each of said grooves having a bottom wall and sidewalls, the sidewall of each of said grooves adjacent said central zone having a chamfered surface; a pressure deformable resilient packing ring in each of said grooves contacting the bottom wall and the seat to provide a seal therebetween at each end of said central zone; at least one longitudinal lubricant channel in said plug member terminating at its ends in the respective grooves, said lubricant channel being V-shaped in cross-section; and means for supplying lubricant under pressure to said longitudinal lubricant channel and to said grooves whereby lubricant under pressure deforms said packing rings uniformly about the same against the respective sidewalls of said grooves away from said central zone.

References Cited
UNITED STATES PATENTS

| | | | |
|---|---|---|---|
| 2,653,791 | 9/1953 | Mueller | 137—246.15 |
| 2,746,478 | 5/1956 | Johnson | 137—246.16 |
| 2,829,667 | 4/1958 | Mueller | 137—246.15 |
| 2,829,668 | 4/1958 | Mueller | 137—246.16 |
| 2,898,081 | 8/1959 | Johnson | 137—246.15 X |
| 3,004,550 | 10/1961 | Poisker | 137—246.15 |

CLARENCE R. GORDON, Primary Examiner